United States Patent [19]
Smith

[11] Patent Number: 5,357,388
[45] Date of Patent: Oct. 18, 1994

[54] SHORTED DUAL ELEMENT MAGNETORESISTIVE REPRODUCE HEAD EXHIBITING HIGH DENSITY SIGNAL AMPLIFICATION

[75] Inventor: Neil Smith, San Diego, Calif.

[73] Assignee: Eastman Kodak Company, Rochester, N.Y.

[21] Appl. No.: 949,922

[22] Filed: Nov. 16, 1992

Related U.S. Application Data

[62] Division of Ser. No. 802,576, Dec. 5, 1991, Pat. No. 5,193,038, which is a division of Ser. No. 500,978, Mar. 29, 1990, Pat. No. 5,084,794.

[51] Int. Cl.⁵ .......................................... G11B 5/127
[52] U.S. Cl. .......................................... 360/113
[58] Field of Search .......................................... 360/113

[56] References Cited

U.S. PATENT DOCUMENTS 4,896,235  1/1990  Takino .......................................... 360/113

Primary Examiner—A. J. Heinz
Attorney, Agent, or Firm—William F. Noval

[57] ABSTRACT

An MR head includes two substantially identical MR elements, separated by a thin film non-magnetic spacer which is electrically conductive along at least a portion of its length. A current applied to the MR head splits into two respective substantially equal currents that flow in the same direction through the substantially identical MR elements, to provide mutual bias and to serve as sense currents for detecting change in element resistance. The MR elements are biased to operate in a magnetically unsaturated mode. This results in a "bootstrapping" of short wavelength signals that effectively amplifies the reproduced signal over a broad region of the signal spectrum when the linear spacing between the MR elements is in the range of from one half to one times the half-wavelength of signals recorded on a magnetic recording medium.

10 Claims, 4 Drawing Sheets

SHORTED DUAL ELEMENT MAGNETORESISTIVE REPRODUCE HEAD EXHIBITING HIGH DENSITY SIGNAL AMPLIFICATION

This is a divisional of application Ser. No. 802,576, filed Dec. 5, 1991, now U.S. Pat. No. 5,193,038, which is a divisional of application Ser. No. 500,978, filed Mar. 29, 1990, which issued as U.S. Pat. No. 5,084,794 in the name of Applicant.

BACKGROUND OF THE INVENTION

1. Field of the Invention

This invention relates to a magnetoresistive reproduce head, and in particular to a dual element magnetoresistive head.

2. Description Relative to the Prior Art

The magnetoresistive (MR) reproduce head has gained wide acceptance in the magnetic recording field since it was disclosed in U.S. Pat. No. 3,493,694, issued to Hunt in 1970. The MR head is characterized by high output and low noise, making it particularly attractive for reproducing short wavelength signals. It may be fabricated by thin film deposition techniques allowing the relatively inexpensive manufacture of multitrack heads with narrow track widths for high density recording applications. A variety of shielded and unshielded configurations using single and dual MR elements and incorporating a number of biasing techniques are known in the art.

Dual element MR heads are disclosed in U.S. Pat. No. 3,860,965 entitled "Magnetoresistive Read Head Assembly Having Matched Elements for Common Mode Rejection", issued in the name of Voegili and U.S. Pat. No. 4,878,140 entitled, "Magnetoresistive Sensor with Opposing Currents for Reading Perpendicularly Recorded Media", issued in the names of Gill et al. The heads disclosed in these patents comprise parallel MR elements separated by thin electrically insulating layers. It has long been known in the art that MR structures such as the above, whose elements are separated by thin electrically insulating spacers, are subject to shorting problems. Such shorting may be due to pin holes in the insulating spacer, or may occur in head lapping, or during head operation when the abrasive magnetic tape being reproduced can smear the soft MR element across the spacer, shorting it to adjacent conductive material. This has occurred, for example, in heads utilizing soft adjacent layer biasing where an MR element is separated by an thin electrically insulating spacer from a conductive magnetic material whose magnetic field induces the bias in the MR element. Bajorek et al, recognizing the problem in their U.S. Pat. No. 4,024,489 entitled "Magnetoresistive Sandwich including Sensor Electrically Parallel with Electrical Shunt and Magnetic Biasing Layers", teach overcoming the problem by intentionally shorting the MR sensing layer and the magnetic biasing layer by use of a very thin (220 angstrom), contiguous conductive separation layer. However, the structure disclosed by Bajorek et al, is stated to result in a 30% loss of signal from the single MR sensor for a given energy dissipation in the head because the current flowing through the conductive shunting layer provides no contribution to signal output.

SUMMARY OF THE INVENTION

In a preferred embodiment, the MR dual element head of the present invention solves the shorting problem between two MR elements (which serve both as sensing elements and mutual biasing elements) without suffering the penalty of significant signal reduction due to shunting of the sense current. The two identical MR elements may be electrically insulated from each other by an insulating spacer layer except where shorted at the respective ends or may be shorted along their entire lengths by a contiguous electrically conductive nonmagnetic spacer. A current applied to the shorted MR elements splits into two equal currents that flow in the same direction through the substantially identical MR elements to provide the bias, and to serve as sense currents for detecting element resistance change. There is no voltage difference across the spacer, and, therefore, electrically conductive regions between the MR elements do not interfere with detection of recorded signals.

Additionally in the practice of the invention, the MR elements are biased to operate in a magnetically unsaturated mode. This results in a "bootstrapping" of short wavelength signals that effectively amplifies the reproduced signal over a broad region of the signal spectrum. The design criterion for determining the amplified portion of the spectrum calls for a linear spacing between the MR elements in the range of from one half to one times the linear distance between the flux changes recorded on the signal medium. Over this range of spacer thickness, the amplified response is relatively insensitive to the separation. For a short wavelength flux density of 80 kiloflux changes per inch, the spacer is typically selected to have a thickness of about 1500 angstroms.

BRIEF DESCRIPTION OF THE DRAWINGS

The invention will be described with respect to the figures, of which.

DESCRIPTION OF THE PREFERRED EMBODIMENTS

Figure 1:
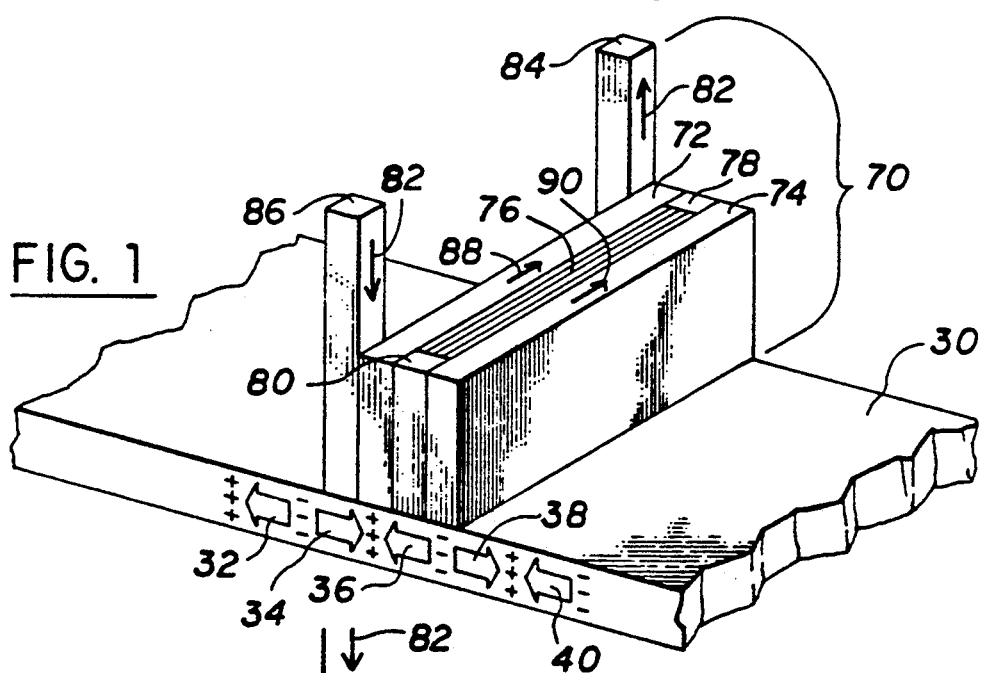
FIG. 1 is a drawing of a dual MR head according to the invention, in contact with a recorded magnetic tape.
Figure 2:
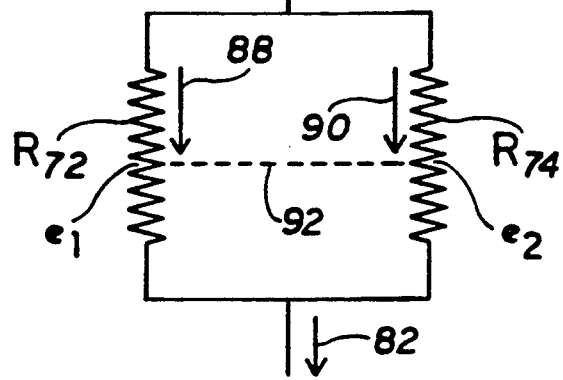
FIG. 2 is a schematic drawing of the resistances of the MR elements of the head of FIG. 1.

In a preferred embodiment of the invention, the MR elements are electrically shorted to each other at their longitudinal ends, but are separated by an electrically insulating spacer for the rest of their lengths. Referring to FIG. 1, a dual MR head 70 consists of two magnetically, electrically and geometrically matched MR elements 72,74. The MR elements 72,74 are separated over substantially their entire lengths by a non-conductive spacer 76. At the longitudinal ends of the spacer 76 are two electrically shorting stubs 78,80, of the same width as the spacer 76, which electrically short the two MR elements to each other. A sense and biasing current 82 flowing to the head 70 via the leads 84, 86 divides between the two MR elements 72,74 into the equal currents 88,90, because the MR elements 72,74 are identical, and because of the electrically shorting stubs 78,80. Referring to FIG. 2, the equivalent electrical circuit of the structure of the MR head 70 is seen with the current 82 flowing into the parallel resistances $R_{72}$, which is the resistance of MR element 72, and $R_{74}$ which is that of the MR element 74. Assuming an inadvertent electrical short 92 occurs between the MR elements 72, 74, due, assay, to a pin hole in the insulating spacer 76, no appreciable current flows through such short because of the substantially identical characteristics of the MR elements 72, 74 and because the equality of the currents 88, 90, and the voltages $e_1$, $e_2$ along the length of each of the MR elements 72,74. That is, no current flows in the electrical short 92, and the distribution of currents in the MR elements is unchanged by the electrical short 92. Therefore, the magnetic biasing and the signal performance, which are functions of the sense currents 88, 90, are operationally immune to the presence of shorts.

The thin film MR elements 72,74 are rectangular in shape. This configuration results in the shape anisotropy of the MR film being along the longitudinal axis of the film, which is also the direction of the unbiased magnetization of the film. As will be explained below, the bias rotates the magnetization from this axial direction, and the signals from the medium further modulate the position of the magnetization, changing the film resistance. It will be noted that the signal fields from the tape 30 are directed along the short dimensions of the MR elements 72,74. The longitudinal width of the sandwich is generally equal to or slightly less than a track width of the data recorded on the tape 30. The values of the head parameters are determined by the application. For example, in a head having a 50 micron trackwidth and operating at 80 kiloflux changes per inch, suitable parameters are: the widths of the MR elements 72, 74 and the spacer 76 equal to 50 microns, the MR element 72,74 thicknesses equal to approximately 250 angstroms, the thickness of the spacer 76 equal to 1500 angstroms, and the heights of the MR elements 72,74, and of the spacer 76 equal to 5 microns.

The MR head 70 is seen in contact with a magnetic tape 30 having alternately magnetized portions 32, 34, 36, 38, 40, throughout the length of the tape 30, which comprise the information recorded on the tape 30. A wavelength of the recorded signal on the tape 30 encompasses two contiguous, oppositely directed magnetized regions, for example, the regions covered by the arrows 32 and 34. The number of alternating magnetized portions 32, 34, 36, 38, 40 per inch is the number of flux changes per inch recorded on the tape 30.

Figure 3A:
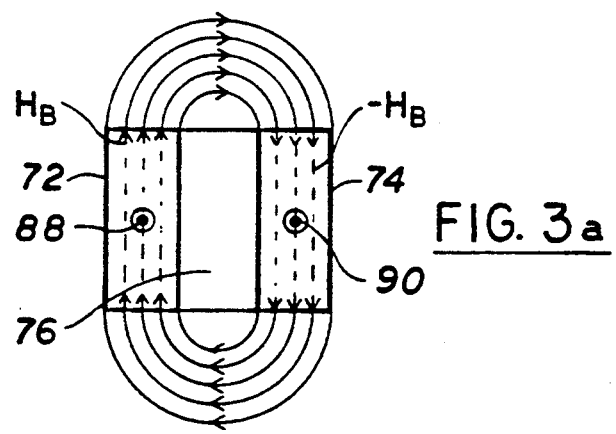
FIG. 3a illustrates the mutual biasing of the MR elements of the head of the invention.

Referring to FIG. 3a, the currents 88, 90, flowing in the same direction into the MR elements 72,74 generate the magnetic fields that result in the mutual biasing of the elements 72,74, because each of the MR elements, as well as being field detection elements, acts as a soft adjacent biasing layer for the other. As the elements 72,74 are magnetically and geometrically the same, and because the amplitudes of the currents 88,90 are the same, the bias field $H_B$ at element 72 due to the soft adjacent biasing layer action of the MR element 74, is equal in magnitude and opposite in sign to the bias field $-H_B$ at element 74 due to the soft adjacent biasing action of the MR element 72. As is known in the art, in biasing the MR elements 72,74, the magnetic field $H_B$ rotates the magnetization of the MR element 72 in one direction, and the field $-H_B$ rotates the magnetization of the MR element 74 an equal amount in the opposite direction.

Figure 3B:
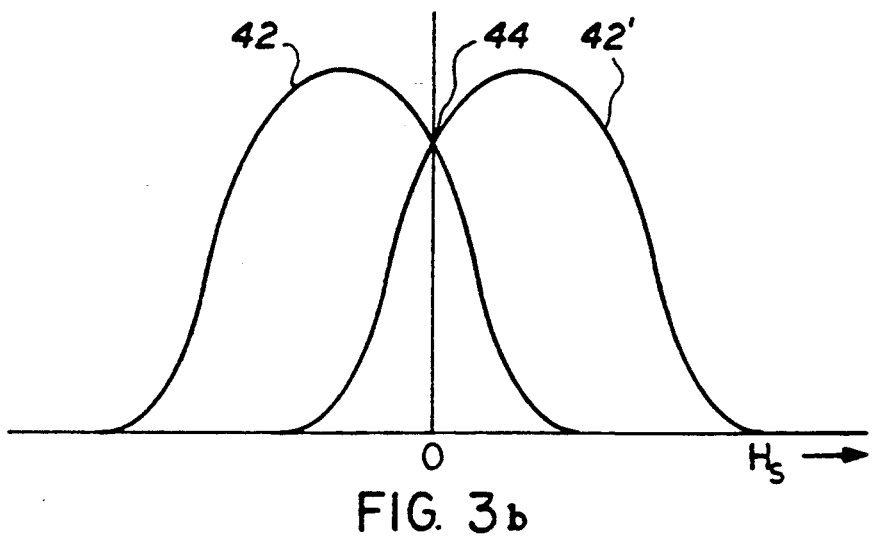
FIG. 3b is a plot of the fractional change in resistance of the oppositely biased MR elements as a function of applied magnetic field.

Referring to FIG. 3b, the curves 42,42' are the symmetrical, change of resistance vs. magnetic field curves for the biased magnetoresistive elements 72,74. As described above, the bias fields in the elements 72,74 have the same amplitudes but opposite signs, and the elements 72,74 themselves are magnetically matched. Therefore, the curves 42,42' (which are arbitrarily assigned to the MR elements 72 and 74 respectively) are substantially identical, and are symmetrically shifted with respect to the origin by the applied bias fields. The horizontal axis of FIG. 3b being the applied signal field, $H_s$, it will be seen that with no applied signal field, the quiescent bias point 44 is symmetrically positioned on the oppositely sloping sides of the curves 42,42'.

U.S. Pat. No. 4,833,560, "Self-Biased Magnetoresistive Reproduce Head" issued in the name of Doyle, and assigned to the same Assignee as the instant application, teaches orienting the induced anisotropy fields of an MR element and a biasing adjacent layer so that their induced anisotropy fields lie in the same directions along the short dimension of the rectangular magnetoresistive elements. It will be recalled in the present invention that each of the MR elements 72,74 acts as a soft adjacent layer for the biasing the other element in addition to its role as a signal detector. The induced anisotropy fields of the MR elements of the present invention can be made to lie in the direction of the bias fields at the MR elements, i.e., along the short dimensions of the MR elements 72,74 as taught by U.S. Pat. No. 4,833,560, which is hereby incorporated by reference.

Figure 4:
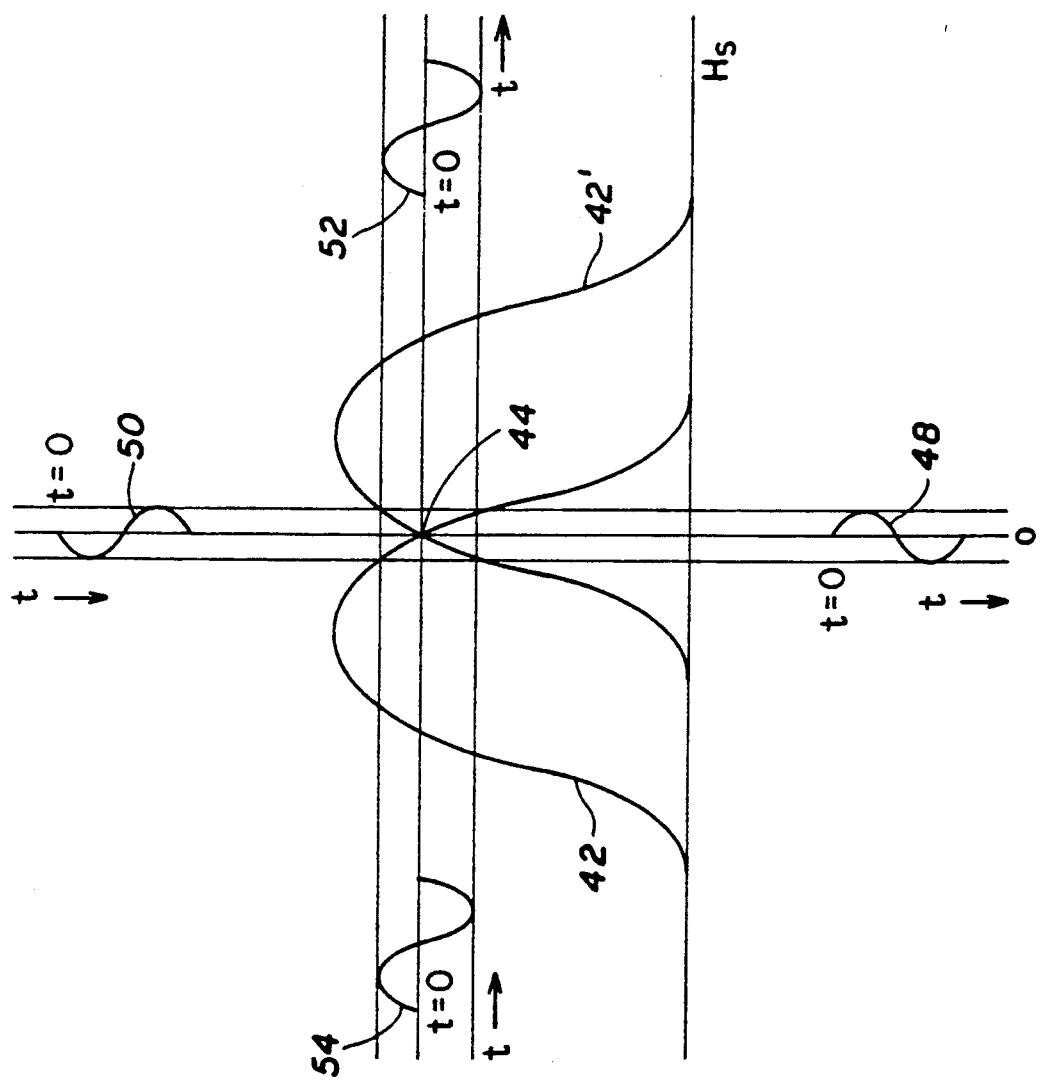
FIG. 4 is a plot of the fractional change in resistance of the MR elements of the head of the invention for applied signal.

Referring again to FIG. 1, it will be seen that the depicted wavelength recorded on the tape 30 is such that a half wavelength is equal to the separation between the MR elements 72,74. Under this condition the magnetic fields from the tape 30 at the elements 72,74 are 180 degrees out of phase. In FIG. 4, the change in resistance vs. magnetic field curves 42,42' is again shown, along with a signal field 48 applied to the MR element 72 (curve 42 applies), while a signal field 50 is applied to the MR element 74 (curve 42' applies). The wavelength of the signals 48,50 is equal to twice the separation of the MR elements 72,74 and therefore the signals 48,50 are 180 degrees out of phase. The signals 48,50 swing the resistance of the MR elements 72, 74 about the bias points 44 and the change of resistance for the MR element 72 is depicted by waveform 52, while that for the MR element 74 is depicted by waveform 54. It will be appreciated that the output signals derived from the above changes in resistance are in phase in the two electrically paralleled MR elements, and therefore the resultant output signal voltages due to the sense currents 88,90 are also in phase.

Figure 5A:
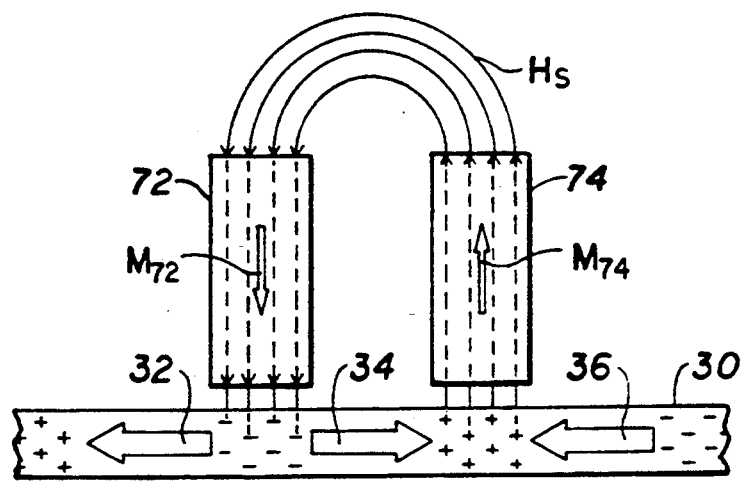
FIGS. 5a, 5b, 5c illustrate the signal amplification effect exhibited by the head of the invention.
Figure 5B:
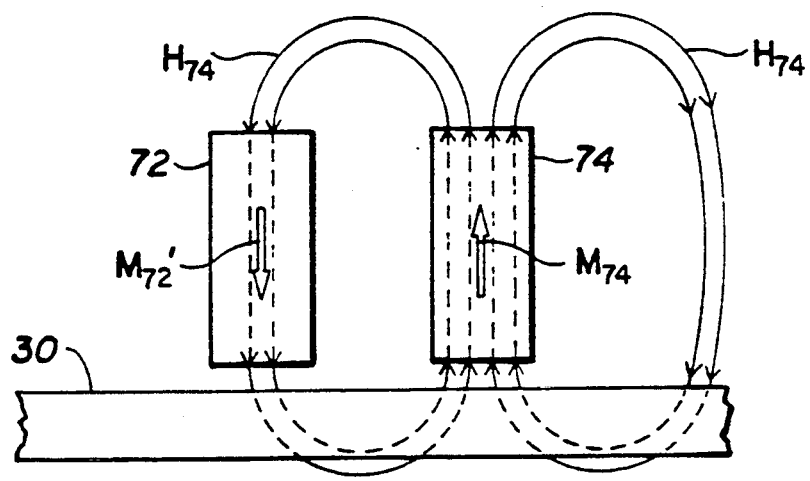
Figure 5C:
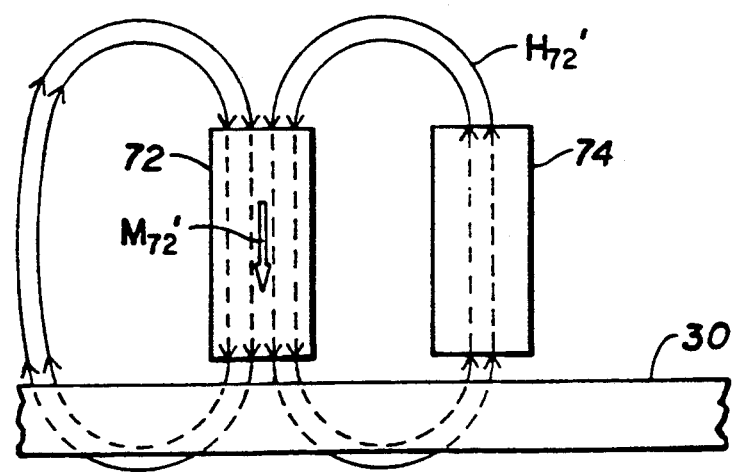

The operation of the invention in effecting amplification of a short wavelength reproduced signal may be understood by referring to FIG. 5a, FIG. 5b, and FIG. 5c, wherein the parts played by the magnetic field of the recorded medium, the induced magnetization in the MR elements, and the induced fields in the MR elements are shown. (The events portrayed in these figures actually occur simultaneously, and all fields are present at the same time. In the figures they are shown occurring in sequence for clarity.) In FIG. 5a, a section of the magnetized medium 30 is illustrated passing under the MR element 72 and MR element 74. Positive magnetization 36 (arbitrarily defined as pointing to the left in FIG. 5a) and negative magnetization (in the opposite direction) 34 recorded in the medium 30 give rise to a signal field $H_S$. FIG. 5a illustrates the condition where the distance between the transitions from positive magnetization to negative magnetization in the medium 30 approximately equals the separation distance between the MR element 72 and the MR element 74. This is the condition for signal amplification. However, as previously noted, the response is relatively insensitive to spacer thickness when it is in the range of from one half to one times the distance between transitions. As shown in FIG. 5a, part of the signal field $H_S$ threads the low magnetic reluctance path through the MR element 72 and MR element 74. Not shown in FIG. 5a, but still present and essential to the operation of the device, are the static fields related to the bias as previously discussed. The field $H_S$ shown in FIG. 5a is a dynamically incremental field due to the magnetization in the medium. The $H_S$ field in traversing the magnetically soft materials comprising the MR elements induces magnetization $M_{72}$ in the MR element 72, and $M_{74}$ in the MR element 74. The induced magnetizations, $M_{72}$ and $M_{74}$, are also dynamically incremental since they arise from the signal field $H_S$. Because both the MR's 72 and 74 are operating on the linear portions of their magnetization curves, it will be appreciated the magnitude of the induced magnetizations $M_{72}$ and $M_{74}$ are directly proportional to the strength of the field $H_S$.

Referring now to FIG. 5b, the magnetization $M_{74}$ induced in the MR element 74 by the signal field $H_S$ of FIG. 5a is shown, but the field lines of the generating field $H_S$ are omitted for clarity. The induced magnetization $M_{74}$ of the MR element 74 in FIG. 5b gives rise to a field $H_{74}$. The flux lines from the field $H_{74}$ extend to, and are intercepted by, the MR element 72. The intercepted flux from $H_{74}$ induces additional magnetization $M_{72}$ in the MR element 72. It will be appreciated that the direction of the field $H_{74}$ is downward at the MR element 72, and again referring to FIG. 5a, it is seen that $H_{74}$ is attendantly in the direction to reinforce the field $H_s$ which originally gives rise to the field $H_{74}$. Thus the field $H_{74}$ further modulates the angular position of the magnetization vector of the MR element 72 and further changes the MR element's 72 magnetoresistance. Referring to FIG. 5c, the induced magnetization $M_{72'}$, of the MR element 72 also results in a field, $H_{72'}$, flux lines of which are, in turn, intercepted by the MR element 74. The field, $H_{72'}$, is upward at the MR element 74, and again referring to FIG. 5b, it will be noted that the field $H_{72}$, reinforces the magnetization $M_{74}$ further increasing the field $H_{74}$. This "bootstrapping" action between the two MR elements, and the signal from the medium provides increased output signal from the MR elements for a given intensity of magnetization of the medium.

When the medium moves $\frac{1}{2}$ the signal wavelength, i.e. by the distance of one signal flux change relative to the head, the magnetization in the medium below the MR element 72 and the MR element 74 are of opposite signs to those described above. It will be appreciated that resultantly the directions of all the induced fields and magnetizations also change signs, and the overall effect is the continued reinforcement of the signal field as described above. The "bootstrapping" again augments the effect of the signal field Hs at the MR element 72, and amplification thus takes place for both signs of the alternating signal magnetic field of the medium.

Figure 6:
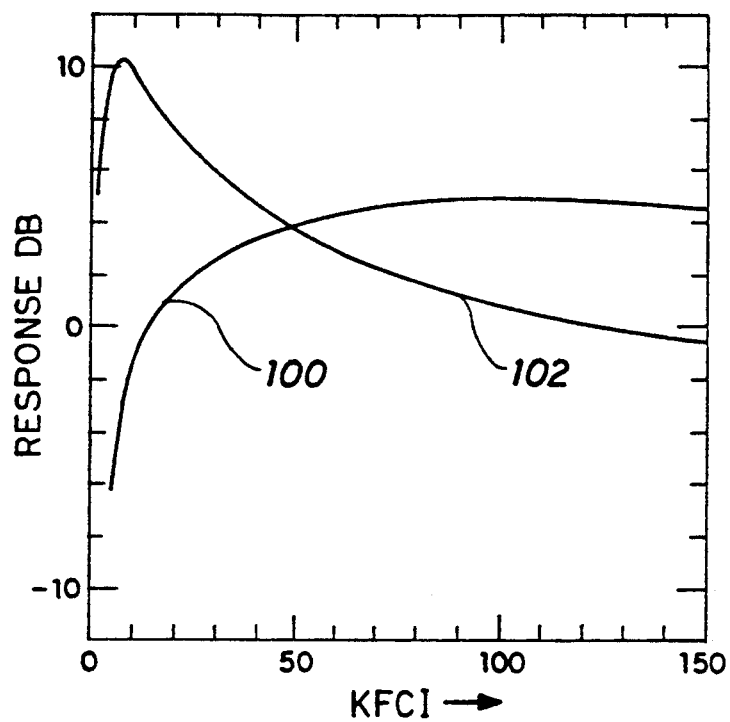
FIG. 6 is a plot of the output signal level as a function of recorded flux density for the head of the invention compared to that of an unshielded MR head.

Referring to FIG. 6, curve 100 is a plot of the response of a dual electrically shorted MR head in accordance with the invention and, for comparison, curve 102 is the corresponding response of an unshielded single MR element head. The head of curve 102 is known in the art as consisting of an MR element which is biased from an external fixed bias source, such as a permanent magnet. A comparison of the curves 100,102 shows the improvement obtained at short wavelengths with a dual MR electrically shorted head.

As previously described, the amplification at shorter wavelengths arises when the separation of the flux changes on the medium is of the same order of magnitude as the distance between the MR elements. As the spacing between the flux transitions increase in length, the response of the head of the invention slowly decreases, with a drop in amplitude when the flux length becomes so long that both of the MR elements simultaneously "see" a signal of the same polarity from the medium.

Figure 7:
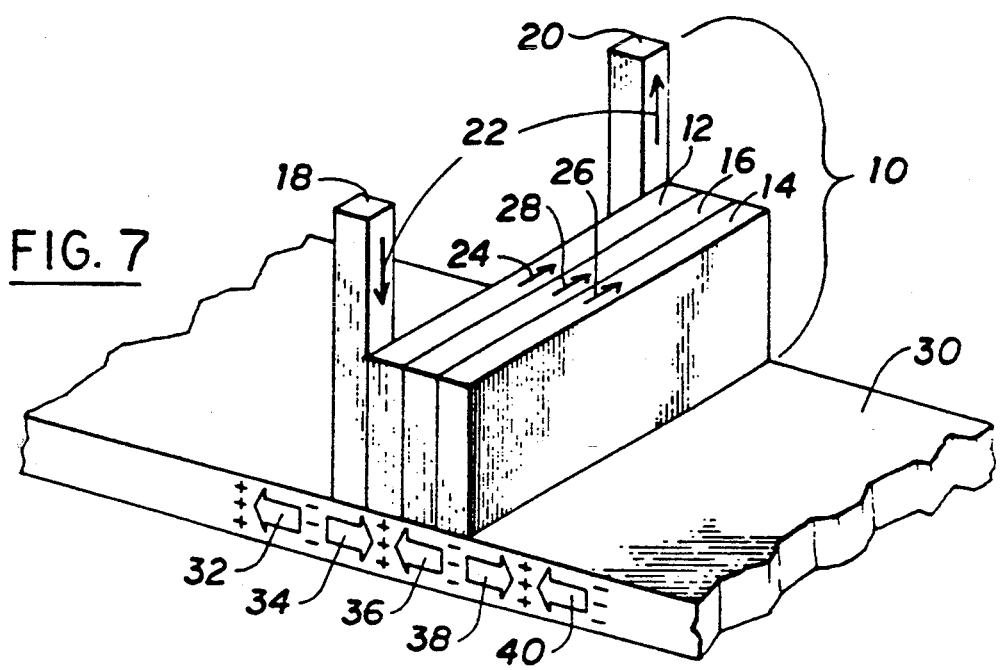
FIG. 7 is a drawing of a second embodiment of the head of the invention.

An alternate preferred embodiment is illustrated in FIG. 7, wherein a dual element magnetoresistive reproduce head 10 comprises sensing and mutually biasing magnetoresistive elements 12, 14, matched for magnetoresistive characteristics, electrical resistivity, and geometrical shape and dimensions. The elements 12, 14 are mated with an electrically conductive, non-magnetic spacer 16 between the element 12, 14 in a sandwich configuration. A current 22, which is the sense current and also the excitation current for biasing the elements 12, 14, flows in the two leads 18, 20 connected to the sandwich.

The components of the sandwich are in electrical contact for their entire lengths and will therefore share any current flowing in the sandwich depending upon their relative resistances. Because the magnetoresistive elements 12,14 are matched for electrical characteristics (as well as magnetic characteristics) and because of the symmetry of the sandwich, the current 22 will divide into component currents 24,26,28 where the currents 24,26 flowing in the same direction through the MR elements 12,14 are equal in magnitude, and the remainder of the current 22, i.e. the current 28, flows in the spacer 16.

In this embodiment, the presence of the conductive spacer 28 obviates the shorting problem. However, in comparison to the head 70 of FIG. 1, the current 28 shunted through the spacer 16 does not contribute to signal detection, and for equal power dissipation the head 10 is not as efficient as the head 70. The head 10 exhibits amplification characteristics similar to those shown in FIG. 6 for the head 70. As seen in FIG. 7, the signal from the tape is also applied in the direction of the short dimension of the MR elements 12,14, and it is therefore advantageous to orient the induced easy axis along this dimension, as previously described for the head 70.

The invention has been described in detail with particular reference to preferred embodiments thereof, but it will be understood that variations and modifications can be effected within the spirit and scope of the invention.

What is claimed is:

1. A magnetic head assembly for detecting magnetically recorded signals having recorded wavelengths, said magnetic head assembly comprising:
   a) a first thin film magnetoresistive element,
   b) a second thin film magnetoresistive element,
   c) a planar non-magnetic thin film spacer in contact with said magnetoresistive elements for separation of said first and said second magnetoresistive elements, said spacer further comprising electrically conductive regions, whereby said electrically conductive regions of said spacer provide electrical shorting between said first and said second magnetoresistive elements,
   d) means for longitudinal concurrent current flow in said first and said second elements, whereby said elements unsaturatedly mutually magnetically bias each other,
   e) means for coupling magnetic signal fields from said magnetically recorded signals to said first and said second magnetoresistive elements in a direction perpendicular to said current flow, whereby said first and said second magnetoresistive elements are concurrently responsive to said signal fields, and
   f) means for detecting the resistance change in said magnetoresistive elements in response to said signal fields.

2. The magnetic head assembly of claim 1 wherein said magnetically recorded signals have been horizontally recorded.

3. The magnetic head assembly of claim 1 wherein said first and said second magnetoresistive elements are substantially matched for magnetic and electrical characteristics.

4. The magnetic head assembly of claim 1 wherein said first and second magnetoresistive elements have first and second induced anisotropy axes along said short dimensions of said magnetoresistive elements respectively.

5. The magnetic head assembly of claim 1 wherein said current means is means for providing equal amplitude currents flowing in said first and said second magnetoresistive elements.

6. The magnetic head assembly of claim 1 wherein said means for coupling signal fields concurrently couples alternating direction signal fields to said first and said second magnetoresistive elements respectively, whereby said alternating fields cooperate with said first and said second magnetoresistive elements to provide amplification of the resistance change in said magnetoresistive elements in response to said signals.

7. The magnetic head of claim 1 wherein said spacer is means for spatially separating said first and said second magnetoresistive elements by a distance in the range of from one half to one times the half wavelength of said recorded signals.

8. The magnetic head assembly of claim 1 wherein said spacer is substantially geometrically congruent to said first magnetoresistive element.

9. The magnetic head assembly of claim 1 wherein said second magnetoresistive element is substantially geometrically congruent to said first magnetoresistive element.

10. The magnetic head assembly of claim 1 wherein said first and second magnetoresistive elements are substantially rectangular.

* * * * *